United States Patent
Wong et al.

(10) Patent No.: US 10,135,055 B2
(45) Date of Patent: Nov. 20, 2018

(54) SEPARATOR FOR SECONDARY BATTERY

(71) Applicant: GRST International Limited, Hong Kong (HK)

(72) Inventors: Sing Ming Tony Wong, Hong Kong (HK); Sing Hung Eric Wong, Hong Kong (HK); Peihua Shen, Guangdong (CN); Yuen Hung, Hong Kong (HK); Kam Piu Ho, Hong Kong (HK); Ranshi Wang, Hong Kong (HK)

(73) Assignee: GRST INTERNATIONAL LIMITED, Hong Kong (HK)

( * ) Notice: Subject to any disclaimer, the term of this patent is extended or adjusted under 35 U.S.C. 154(b) by 0 days.

(21) Appl. No.: 15/603,515

(22) Filed: May 24, 2017

(65) Prior Publication Data

US 2017/0346062 A1 Nov. 30, 2017

Related U.S. Application Data

(60) Provisional application No. 62/341,076, filed on May 25, 2016.

(51) Int. Cl.
*H01M 2/00* (2006.01)
*H01M 2/16* (2006.01)
*H01M 10/0525* (2010.01)
*H01M 2/18* (2006.01)

(52) U.S. Cl.
CPC ......... *H01M 2/1686* (2013.01); *H01M 2/162* (2013.01); *H01M 2/166* (2013.01); *H01M 10/0525* (2013.01); *H01M 2/18* (2013.01)

(58) Field of Classification Search
CPC .. H01M 2/162; H01M 2/166; H01M 10/0525; H01M 2/1686
See application file for complete search history.

(56) References Cited

U.S. PATENT DOCUMENTS

| | | | |
|---|---|---|---|
| 6,423,447 B1* | 7/2002 | Ohsaki | H01M 4/131 29/623.1 |
| 2006/0286446 A1* | 12/2006 | Chun | B32B 27/12 429/142 |
| 2010/0316912 A1* | 12/2010 | Hashimoto | H01G 9/02 429/254 |
| 2014/0212727 A1 | 7/2014 | Hying et al. | |
| 2015/0380705 A1 | 12/2015 | Lee et al. | |

FOREIGN PATENT DOCUMENTS

JP   5617609 B2   11/2014

* cited by examiner

*Primary Examiner* — Cynthia H Kelly
*Assistant Examiner* — Monique M Wills

(57) ABSTRACT

Provided herein is a separator used for an electrochemical device such as a lithium-ion battery. The separator disclosed herein comprises a porous base material, and a protective porous layer coated on one or both surfaces of the porous base material disclosed herein, wherein the protective porous layer comprises an organic binder and an inorganic filler, and wherein a difference in tensile strength of the separator along the TD direction and MD direction is about 15% or less. Also provided herein is a lithium-ion battery including the separator disclosed herein. The separator disclosed herein is excellent in terms of safety, ion permeability, and cycle characteristics.

18 Claims, 4 Drawing Sheets

SEPARATOR FOR SECONDARY BATTERY

CROSS-REFERENCE TO RELATED APPLICATION

This application claims the benefit of U.S. Provisional Patent Application No. 62/341,076, filed on May 25, 2016, the entire content of which is hereby incorporated by reference.

FIELD OF THE INVENTION

This invention relates to a separator used for an electrochemical device such as a lithium-ion battery and a lithium-ion battery including the separator disclosed herein. More particularly, the present invention relates to a separator in which a protective porous layer made of a mixture of an organic binder and inorganic filler is formed on one or both surfaces of a porous base material, and an electrochemical device containing the separator disclosed herein.

BACKGROUND OF THE INVENTION

Lithium-ion batteries (LIBs) have been widely utilized in various applications especially consumer electronics such as laptop computers, mobile phones, and digital cameras, etc. Recently lithium-ion batteries have started to be used in automobiles due to their superior energy and power density.

LIB s generally include an anode, a cathode, a separator, and an electrolyte. The anode and cathode are separated from one another by a separator in order to prevent short circuit while maintaining ion conductivity.

A separator is conventionally a thin, porous, electrically insulating material having high ion permeability, good mechanical strength and long-term stability to the chemicals and solvents used in the system, for example electrolyte of the electrochemical cell.

Separator for use in high performance battery system must be safe since very large quantities of energy are stored in the fully charged state in the battery. These energies must not be released in an uncontrolled manner in the event of malfunctioning of the battery, such as overcharging or short-circuit, since this would lead to an explosion or ignition of the battery.

Generally, a typical organic separator consists of a composite film comprising a polyolefin-based substrate and an inorganic coating layer. A major disadvantage of these polyolefin-based separators is their low thermal stability limit. When the battery temperature exceeds 150° C. or lower, the organic separator rapidly shrinks. A cathode and an anode will directly contact to each other, to cause enlargement of short-circuited area. Therefore, such a separator is prone to cause battery short circuit and is generally not safe.

As a result, it is necessary to provide a separator that does not cause heat shrinking at high temperature.

JP Pat. No. 5617609 has disclosed a separator having a shutdown function. The separator comprises an ultra-high molecular weight polyethylene (UHMWPE), high-density polyethylene (HDPE) and an inorganic oxide, and has a shutdown temperature of approximately 134° C. which is the melting point of the HDPE. However, because such separator is still a polyolefin-base material, they have a disadvantage of obtaining a significant improvement in safety including prevention of heat shrinking at high temperature. Therefore, there is a great possibility of short-circuit between a cathode and an anode caused by shrinking or melting of separators in the event of an accident.

In another aspect, a separator must be strong enough to withstand the tension of the winding operation during battery assembly. In order to prevent possibility of damage such as a tear of the separator during a manufacturing process, different attempts have been made to solve the problem and improve the performance of the separator including mechanical strength, abrasion resistance and flexibility, etc.

U.S. Patent Application No. 20140212727 A1 has described a separator having a good mechanical stability for the ease of handling in battery manufacture. The separator comprises fibers of an electrically nonconductive material, and a porous electrically nonconductive coating comprising oxide particles, an inorganic adhesive and polymer particles. The separator shows improved laminatability in contact with electrodes, improved flexibility, higher tolerance to buckling, and greater penetration strength. However, the inorganic adhesive has been prepared via a particulate sol or a polymeric sol. This makes the manufacturing process more complex. In addition, only some physical properties, such as MacMullin number and Gurley Number, of the separator have been measured. However, the physical properties of the separator alone do not mean superior battery performance.

U.S. Patent Application No. 20150380705 A1 has described a polyolefin separator which has high tensile strength and low melt shrinkage in the machine direction (MD) and the transverse direction (TD) through regulation of a stretching process. This involves subjecting the separator to TD relaxation to remove stress from the separator subjected to the TD stretching. However, regulation of a stretching process is not suitable for separator that operates at high speed on a roll-to-roll process. Furthermore, the separator made of polyolefin will easily shrink even at a temperature of about 150° C. or lower.

In view of the above, there is always a need to develop separators which have distinctly improved mechanical and thermal stability and are suitable for mass production to meet the performance requirement in lithium high power batteries.

SUMMARY OF THE INVENTION

The aforementioned needs are met by various aspects and embodiments disclosed herein. In one aspect, provided herein is a secondary-battery separator comprising, a porous base material, and a protective porous layer coated on one or both surfaces of the porous base material, wherein the protective porous layer comprises an organic binder and an inorganic filler, and wherein a difference in tensile strength of the separator along the TD direction and MD direction is about 15% or less.

In some embodiments, the inorganic filler is a whisker-type material selected from the group consisting of $Al_2O_3$, $SiO_2$, $TiO_2$, $ZrO_2$, $BaO_x$, ZnO, $CaCO_3$, TiN, AlN, $MTiO_3$, $K_2O \cdot nTiO_2$, $Na_2O \cdot mTiO_2$, and combinations thereof, wherein x is 1 or 2; M is Ba, Sr or Ca; n is 1, 2, 4, 6 or 8; and m is 3 or 6. In certain embodiments, the whisker-type material has an average diameter from about 0.05 μm to about 3 μm and a ratio of length to diameter from about 5 to about 300.

In certain embodiments, the inorganic filler further comprises a particulate-type material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2. In some embodiments, the particulate-type material has an average diameter from about 100 nm to about 2000 nm. In some embodiments, the particulate-type material has an average diameter from about 0.6 µm to about 10 µm.

In some embodiments, the protective porous layer is a single-layered structure. In certain embodiments, the particulate-type material and the whisker-type material are randomly distributed throughout the protective porous layer.

In certain embodiments, the protective porous layer is a two-layered structure comprising a first layer and a second layer, wherein the first layer is adjacent to the porous base material and the second layer is on and in contact with the first layer. In some embodiments, the particulate-type material resides in the first layer and the whisker-type material resides in the second layer. In other embodiments, a substantial portion of the particulate-type material resides in the first layer and a substantial portion of the whisker-type material resides in the second layer.

In some embodiments, the average thickness ratio of the second layer to the first layer is from about 1:3 to about 3:1.

In certain embodiments, the protective porous layer does not comprise the whisker-type material. In further embodiments, the inorganic filler is a particulate-type material selected from the group consisting of $Al_2O_3$, $SiO_2$, $TiO_2$, $ZrO_2$, $BaO_x$, $ZnO$, $CaCO_3$, $TiN$, $AlN$, and combinations thereof, wherein x is 1 or 2. In certain embodiments, the particulate-type material has an average diameter from about 100 nm to about 2000 nm. In some embodiments, the particulate-type material has an average diameter from about 0.6 µm to about 10 µm.

In some embodiments, the protective porous layer is a single-layered structure and has a first side adjacent to the porous base material, and a second side adjacent to an anode or a cathode, wherein an amount of the organic binder at the first side is greater than an amount of the organic binder at the second side.

In certain embodiments, the protective porous layer is a two-layered structure comprising a first layer and a second layer, wherein the first layer has a first side adjacent to the porous base material and the second layer has a second side adjacent to an anode or a cathode, and wherein an amount of the organic binder at the first side is greater than an amount of the organic binder at the second side.

In some embodiments, the porous base material is a non-woven fabric consisting of natural or polymeric fibers. In certain embodiments, the polymeric fibers of the porous base material have a melting point of 200° C. or higher. In some embodiments, the polymeric fibers of the porous base material are selected from the group consisting of polyester, polyacetal, polyamide, polycarbonate, polyimide, polyetherether ketone, polyether sulfone, polyphenylene oxide, polyphenylene sulfide, polyethylene naphthalate, and combinations thereof. In certain embodiments, the polyester is polyethylene terephthalate, polybutylene terephthalate, or a combination thereof.

In certain embodiments, the organic binder is selected from the group consisting of polyester, polyamide, polyether, polyimide, polycarboxylate, polycarboxylic acid, polyvinyl compound, polyolefin, rubber, polyvinyl pyrrolidone, polyacrylic acid, polyacrylate, polymethacrylic acid, polymethacrylate, polystyrene, polyvinyl alcohol, polyvinyl acetate, polyacrylamide, cellulose, cellulose acetate, cellulose acetate butyrate, cellulose acetate propionate, carboxymethyl cellulose, cyanoethylcellulose, cyanoethylsucrose, polyurethane, nitrile butadiene rubber (NBR), styrene butadiene rubber (SBR), latex, acrylonitrile-styrene-butadiene copolymer, fluorinated polymer, chlorinated polymer, and combinations thereof.

In some embodiments, the weight ratio of the inorganic filler to the organic binder is from about 99:1 to about 1:1.

In certain embodiments, the separator has a thickness from about 1 µm to about 80 µm.

In some embodiments, the separator has a porosity from about 40% to about 97%.

In another aspect, provided herein is a method for producing a battery, comprising, inserting the separator disclosed herein into the battery.

Also provided herein is a lithium battery comprising the separator disclosed herein.

DETAILED DESCRIPTION OF THE INVENTION

General Definitions

Figure 1:
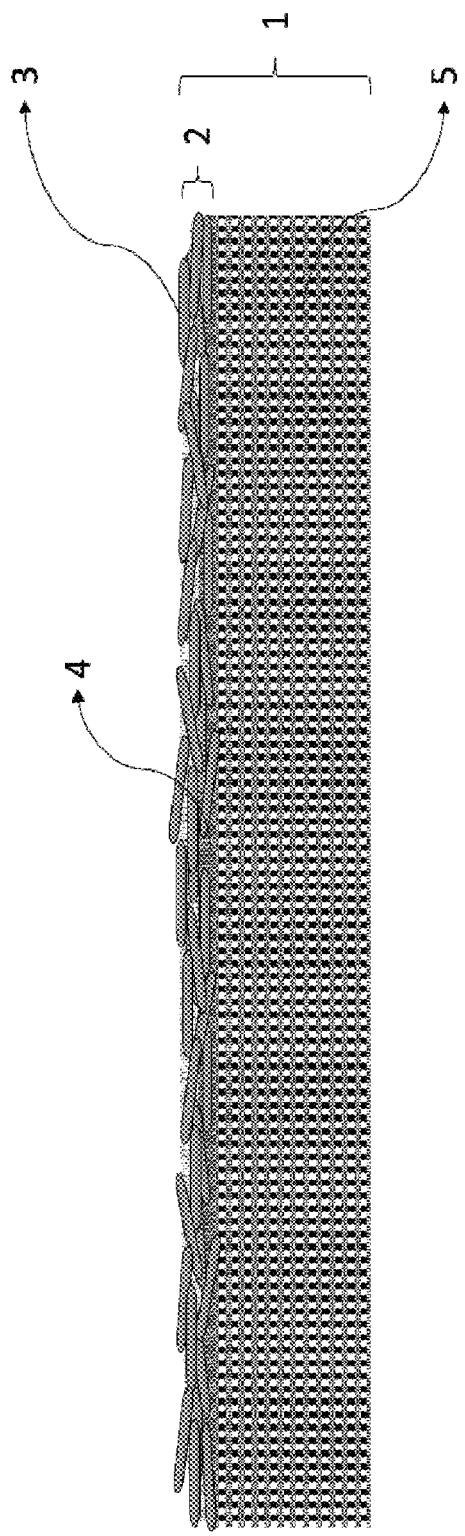
FIG. 1 depicts a schematic structure of a separator of Example 1.

The term "porous base material" refers to a substrate having pores or voids inside. The material used as a component of the porous base material may be an organic material or an inorganic material as long as the material is an electrically insulating material. Any porous base material that has an electrically insulating property can be used herein. Some non-limiting examples of the porous base material include a porous sheet formed of a fibrous material, such as woven or nonwoven fabric or a paper-like sheet. Some non-limiting examples of the fibrous material include natural and polymeric fibers.

The term "non-woven" refers to products made by processes that do not include weaving nor knitting. The fibers in these materials are bonded together by chemical, mechanical, heat or solvent treatment.

The term "polymer" refers to a polymeric compound prepared by polymerizing monomers, whether of the same or a different type. The generic term "polymer" embraces the terms "homopolymer," "copolymer," "terpolymer" as well as "interpolymer."

The term "interpolymer" refers to a polymer prepared by the polymerization of at least two different types of monomers. The generic term "interpolymer" includes the term "copolymer" (which generally refers to a polymer prepared from two different monomers) as well as the term "terpolymer" (which generally refers to a polymer prepared from three different types of monomers). It also encompasses polymers made by polymerizing four or more types of monomers.

The term "polyester" refers to a polymer having an ester functional group in each repeating unit on its main chain. Some non-limiting examples of suitable polyester include polyethylene terephthalate (PET), polybutylene terephthalate (PBT), polyethylene naphthalate (PEN), and poly(cyclohexanedimethylene terephthalate) (PCT).

The term "protective porous layer" refers to one or more layers coated on one side or both sides of a porous base material. The protective porous layer includes a mixture of at least one organic binder and at least one inorganic filler.

The protective porous layer may further comprise one or more additives, in addition to the organic binder and inorganic filler. The protective porous layer may have a single-layered, two-layered, or multi-layered structure.

The term "organic binder" refers to a substance used for joining an inorganic filler to a porous base material or to each other. Any organic binder that can join the inorganic filler to the porous base material or to each other can be used herein. Some non-limiting examples of the organic binder include polyester, polyamide, polyacrylic acid, polyether, polyimide, polyolefin, rubber, styrene-butadiene rubber (SBR), acrylonitrile-butadiene rubber, cellulose, cellulose derivative, latex, and combinations thereof.

The term "unsaturated polymer" refers to a polymer having one or more unsaturated groups in the polymer chain. The unsaturated groups can be, for example, carbon-carbon double or triple bonds or carbon-nitrogen double or triple bonds.

The term "conjugated diene polymer" refers to a homopolymer of a conjugated diene, copolymer of two or more different conjugated dienes and copolymer of a conjugated diene and a vinyl-substituted aromatic hydrocarbon. Some non-limiting examples of the conjugated diene polymer include polybutadiene, polyisoprene, butadiene/styrene random copolymer, isoprene/styrene random copolymer, acrylonitrile/butadiene copolymer, acrylonitrile/butadiene/styrene copolymer, butadiene/styrene block copolymer, styrene/butadiene/styrene block copolymer, isoprene/styrene block copolymer, and styrene/isoprene/styrene block copolymer.

The term "block copolymer" refers to a polymer including two or more polymer blocks.

The term "polymer block" refers to a grouping of multiple monomer units, which can be the same (e.g., a homopolymer block) or different (e.g., a copolymer block, a random copolymer block, etc.), and which are part of a continuous polymer chain, which forms part of a larger polymer. A wide variety of block copolymers is contemplated herein including diblock copolymers (i.e., polymers including two polymer blocks), triblock copolymers (i.e., polymers including three polymer blocks), multiblock copolymers (i.e., polymers including more than three polymer blocks), and combinations thereof.

The term "inorganic filler" refers to a substance that is electrically nonconductive. Some non-limiting examples of the inorganic filler include metal oxides, and non-oxide and non-metallic materials. Some non-limiting examples of the metal oxides include aluminium oxides, zirconium oxides, barium titanate, lead zirconate titanates, ferrites, zinc oxide, and combinations thereof. Some non-limiting examples of the non-oxide and non-metallic materials include silicon carbide, silicon nitride, aluminium nitride, boron nitride, titanium boride, molybdenum silicide, and combinations thereof.

The term "whisker-type material" refers to an inorganic material in a needle-like form. In some embodiments, the needle-like form has a regular shape, such as circular or polygonal shape. In certain embodiments, the needle-like form has a uniform thickness along its length. In other embodiments, the diameter of the whisker varies along its length, and the shape of the whisker may be irregular with alternating thick and thin sections.

The term "whisker" refers to a particle having an aspect ratio (i.e. length to diameter ratio) of about 5 or more.

The term "diameter of a whisker-type material" refers to a maximum cross-sectional dimension of a whisker.

The term "tensile strength" refers to the maximum stress a material subjected to a stretching load can withstand without tearing.

The term "machine direction" or "MD direction" refers to the direction along the length of the separator. The MD direction is also referred to as a "longitudinal direction."

The term "transverse direction" or "TD direction" refers to the direction across the separator or perpendicular to the machine direction. The TD direction is also referred to as a "width direction."

The term "first layer of the protective porous layer" refers to a layer adjacent to a porous base material.

The term "second layer of the protective porous layer" refers to a layer on and in contact with the first layer of the protective porous layer.

The term "substantial portion" of an inorganic filler refers to a portion greater than 99.9%, greater than 99.5%, greater than 99%, greater than 98%, greater than 97%, greater than 96%, greater than 95%, greater than 90%, greater than 85%, greater than 80%, greater than 75%, greater than 70%, greater than 65%, greater than 60%, greater than 55%, or greater than 50%, based on the total volume or weight of the inorganic filler.

The term "first side of the protective porous layer" refers to a side adjacent to a porous base material.

The term "second side of the protective porous layer" refers to a side adjacent to an anode or a cathode.

The term "porosity" refers to the total void space in a material attributable to the presence of pores, or the ratio of the pore volume to the total volume of a material. In the case where the separator is made up of a porous base material and a protective porous layer, the number of pores of the separator is the sum of the number of pores of the porous base material and the number of pores of the protective porous layer.

The term "pore volume" refers to the total void space in a material attributable to the presence of pores in units of volume percent.

The term "average pore size" refers to a value calculated by a formula 4V/S where S is a specific surface area and V is a pore volume per unit mass obtained from a pore size distribution measured by a mercury compression method.

The term "cylindrical pore" or "cylindrically shaped pore" refers to a pore formed through the top and the bottom of the separator, of which a cross section is circular or nearly circular on both the top and the bottom, and each cross section at the top, bottom and passage has the same or similar size.

The term "heat resistance" refers to a characteristic in which melting or decomposition does not occur in a temperature range of 200° C. or lower.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or the full energy in 10 hours; and a 5 C means utilization of the full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is $1/1,000$ of an ampere-hour.

The term "doctor blading" refers to a process for fabrication of large area films on rigid or flexible substrates. A coating thickness can be controlled by an adjustable gap width between a coating blade and coating surface, which allows the deposition of variable wet layer thicknesses.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

The present invention provides a secondary-battery separator comprising, a porous base material, and a protective porous layer coated on one or both surfaces of the porous base material, wherein the protective porous layer comprises an organic binder and an inorganic filler, and wherein a difference in tensile strength of the separator along the TD direction and MD direction is about 15% or less.

The separator disclosed herein is suitable for primary and secondary (rechargeable) lithium batteries, nickel metal hydride, nickel-cadmium, and silver-zinc batteries. It is also suitable for use in battery systems with comparatively high operating temperatures.

Generally, conventional organic separator may comprise a porous base material and a protective porous layer. However, all of the conventional separators have never possessed an important relation between the porous base material and inorganic filler which enables strong tensile strength of the separator along the TD direction and MD direction. In particular, no prior art document describes a protective porous layer comprising an inorganic filler in the form of whisker. Separators disclosed herein have high porosity, uniform pore distribution, well defined and controlled pore geometry, and high film strength.

Furthermore, the present invention does not follow in obvious manner of the choice of the porous base material and inorganic filler. The present invention therefore overcomes the problems associated with prior arts as mentioned above.

The separator of the present invention also has a distinct advantage over separators based on woven or non-woven polymeric or ceramic fabrics as described in prior art. One reason for this is that the porous base material disclosed herein exhibits a high tensile strength in both TD and MD directions and hence a high tearing resistance.

The porous base material may comprise woven or nonwoven polymeric fibers, natural fibers, carbon fibers, glass fibers or ceramic fibers. In some embodiments, the porous base material comprises woven or nonwoven polymeric fibers.

In certain embodiments, the porous base material is a nonwoven comprising polymeric fibers. In some embodiments, the fibers of the nonwoven could be made of organic polymers, such as polyolefin, polyester, polyacetal, polyamide, polycarbonate, polyimide, polyetherether ketone, polysulfones, polyphenylene oxide, polyphenylene sulfide, polyacrylonitrile, polyvinylidene fluoride, polyoxymethylene, polyvinyl pyrrolidone, or a combination thereof. But all other known polymeric fibers or many natural fibers can be used as well.

Some non-limiting examples of suitable polyolefin include polypropylene, polyethylene, and polypropylene/polyethylene co-polymer.

In order to improve thermal stability of the nonwoven, the fibers having a melting temperature of 200° C. or above should be used. In some embodiments, the fibers are selected from polyester. Some non-limiting examples of suitable polyester include polyethylene terephthalate, polybutylene terephthalate, polyethylene naphthalate, polybutylene naphthalate, derivatives thereof, and combinations thereof. The use of these organic polymers allows the production of a separator that exhibits only a small amount of thermal shrinkage.

The nonwoven fabric may be produced by a publicly known process. Some non-limiting examples of suitable process include dry process, spun bond process, water needle process, spun lace process, wet process, melt-blowing process and the like.

In some embodiments, the natural or polymeric fibers of the porous base material have an average thickness from about 0.5 µm to about 10 µm, from about 1 µm to about 10 µm, from about 1.5 µm to about 10 µm, from about 1 µm to about 7 µm, from about 1 µm to about 5 µm, or from about 2.5 µm to about 7.5 µm. In certain embodiments, the fibers of the porous base material have an average thickness from about 0.2 µm to about 10 µm.

If the average thickness of fibers is less than 0.2 µm, the non-woven fabric produced has deteriorated mechanical properties. Also, if the average thickness of fibers is greater than 10 µm, it is not easy to control the size of pores in the non-woven fabric.

In some embodiments, the porous base material has a thickness from about 10 µm to about 200 µm, from about 30 µm to about 100 µm, from about 15 µm to about 80 µm, from about 25 µm to about 50 µm, from about 15 µm to about 40 µm, from about 15 µm to about 30 µm, from about 15 µm to about 25 µm, from about 15 µm to about 20 µm, or from about 10 µm to about 20 µm.

The thickness of the porous base material has a considerable influence on the properties of the separator. Thinner separators allow an increased packing density in a battery pack since a larger amount of energy can be stored in the same volume.

In some embodiments, the porous base material has a thickness of about 15 µm, about 20 µm, or about 25 µm. Separators having such a thickness make it possible to build very compact batteries with a high energy density.

The separator of the present invention includes a planar nonwoven fabric base material having a plurality of pores.

In some embodiments, the porous base material has an average pore size from about 10 nm to about 2000 nm, from about 150 nm to about 1500 nm, from about 20 nm to about 1000 nm, from about 300 nm to about 1000 nm, from about 300 nm to about 800 nm, or from about 300 nm to about 500 nm.

Porosity of the porous base material in this context is defined as the volume of the nonwoven (100%) minus the volume of the fibers of the nonwoven, i.e. the fraction of the volume of the nonwoven that is not taken up by material. The volume of the nonwoven can be calculated from the dimensions of the nonwoven. The volume of the fibers is calculated from the measured weight of the nonwoven in question and the density of the polymeric fibers.

In some embodiments, the porous base material has a porosity from about 50% to about 97%, from about 50% to about 95%, from about 50% to about 80%, from about 55% to about 90%, from about 55% to about 80%, from about 60% to about 95%, from about 60% to about 90%, from about 60% to about 80%, from about 65% to about 90%, from about 65% to about 80%, from about 70% to about 90%, from about 70% to about 80%, from about 75% to about 90%, or from about 80% to about 90%.

The nature of the porous base material disclosed herein, which comprises a particularly useful combination of thickness and porosity, makes it possible to produce separators which meet the requirements for separators in high power batteries, especially lithium high power batteries.

In some embodiments, the protective porous layer comprises an organic binder and an inorganic filler. In certain embodiments, the inorganic filler does not comprise a whisker-type material and is a particulate-type material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2.

In certain embodiments, the particulate-type material has an average diameter from about 100 nm to about 2000 nm, from about 100 nm to about 1000 nm, from about 250 nm to about 1500 nm, from about 300 nm to about 3 μm, from about 500 nm to about 4.5 μm, from about 500 nm to about 6 μm, from about 1 μm to about 20 μm, from about 10 μm to about 20 μm, from about 1 μm to about 15 μm, from about 1 μm to about 7.5 μm, from about 1 μm to about 4.5 μm, from about 1 μm to about 3 μm, or from about 800 nm to about 2.5 μm.

In some embodiments, the inorganic filler does not comprise a particulate-type material and is a whisker-type material selected from the group consisting of $Al_2O_3$, $SiO_2$, $TiO_2$, $ZrO_2$, $BaO_x$, ZnO, $CaCO_3$, TiN, AlN, $MTiO_3$, $K_2O \cdot nTiO_2$, $Na_2O \cdot mTiO_2$ and combinations thereof, wherein x is 1 or 2; M is Ba, Sr or Ca; n is 1, 2, 4, 6 or 8; and m is 3 or 6. In certain embodiments, the whisker-type material is randomly distributed throughout the protective porous layer.

FIG. 1 shows a schematic structure of a separator (1) of Example 1, in which a protective porous layer (2) having a single-layered structure comprising a whisker-type material (3) and an organic binder (4) is formed on a porous base material (5).

The whisker-type material has a needle-like, acicular shape, which has a high elastic modulus. Some non-limiting examples of the whisker-type material include inorganic oxides, carbides, borides and nitrides. In some embodiments, the whisker-type material is a mixture of whiskers of different materials.

In some embodiments, the whisker-type material has an average diameter from about 0.05 μm to about 3 μm, from about 0.1 μm to about 3 μm, from about 0.5 μm to about 3 μm, from about 0.5 μm to about 2 μm, from about 0.5 μm to about 1 μm, from about 0.6 μm to about 2 μm, or from about 0.8 μm to about 2 μm.

In some embodiments, the whisker-type material has an average length from about 0.05 μm to about 30 μm, from about 0.05 μm to about 25 μm, from about 0.05 μm to about 20 μm, from about 0.1 μm to about 20 μm, from about 1 μm to about 20 μm, from about 1 μm to about 15 μm, from about 1 μm to about 10 μm, from about 1 μm to about 8 μm, from about 1 μm to about 5 μm, from about 2 μm to about 10 μm, from about 2 μm to about 8 μm, from about 3 μm to about 10 μm, from about 4 μm to about 20 μm, from about 4 μm to about 10 μm, from about 5 μm to about 20 μm, or from about 5 μm to about 10 μm.

In certain embodiments, the whisker-type material has a ratio of length to diameter from about 5 to about 300, from about 5 to about 250, from about 5 to about 200, from about 5 to about 150, from about 5 to about 100, from about 6 to about 20, from about 6 to about 13, from about 6 to about 10, from about 25 to about 300, from about 25 to about 200, from about 25 to about 100, from about 50 to about 300, from about 50 to about 200, or from about 50 to about 100. In some embodiments, the whisker-type material has a ratio of length to diameter of about 5:1, about 8:1, about 10:1, about 15:1, about 20:1, about 50:1, about 100:1, or about 150:1.

The protective porous layer made of an inorganic filler that is bound via the organic binder has a structure wherein void space is formed between the inorganic filler. This void space constitutes pores of the protective porous layer.

The protective porous layer disclosed herein also achieves a particularly high porosity with the pores being sufficiently small to prevent lithium dendrites growing through the separator.

The concomitant use of two types of inorganic fillers allows us to control the pore size and porosity of the separator by varying the diameter and ratio of the whisker-type material and particulate-type material.

In some embodiments, the protective porous layer comprising a particulate-type material and a whisker-type material has a single-layered structure, wherein the particulate-type material and the whisker-type material are randomly distributed throughout the protective porous layer. In certain embodiments, the whisker-type material and particulate-type material can be stably fixed by an organic binder on the surface of the porous base material. The particulate-type material can also be fixed in a part of the pores of the porous base material.

In certain embodiments, the protective porous layer comprising a particulate-type material and a whisker-type material has a two-layered structure comprising a first layer and a second layer, wherein the first layer is adjacent to the porous base material and the second layer is on and in contact with the first layer. In some embodiments, the particulate-type material resides in the first layer and the whisker-type material resides in the second layer. In other embodiments, a substantial portion of the particulate-type material resides in the first layer and a substantial portion of the whisker-type material resides in the second layer. The particulate-type material can be stably fixed by an organic binder on the surface of the porous base material, and in a part of the pores of the porous base material. The whisker-type material can be stably fixed by an organic binder on the surface of the first layer.

Figure 2:
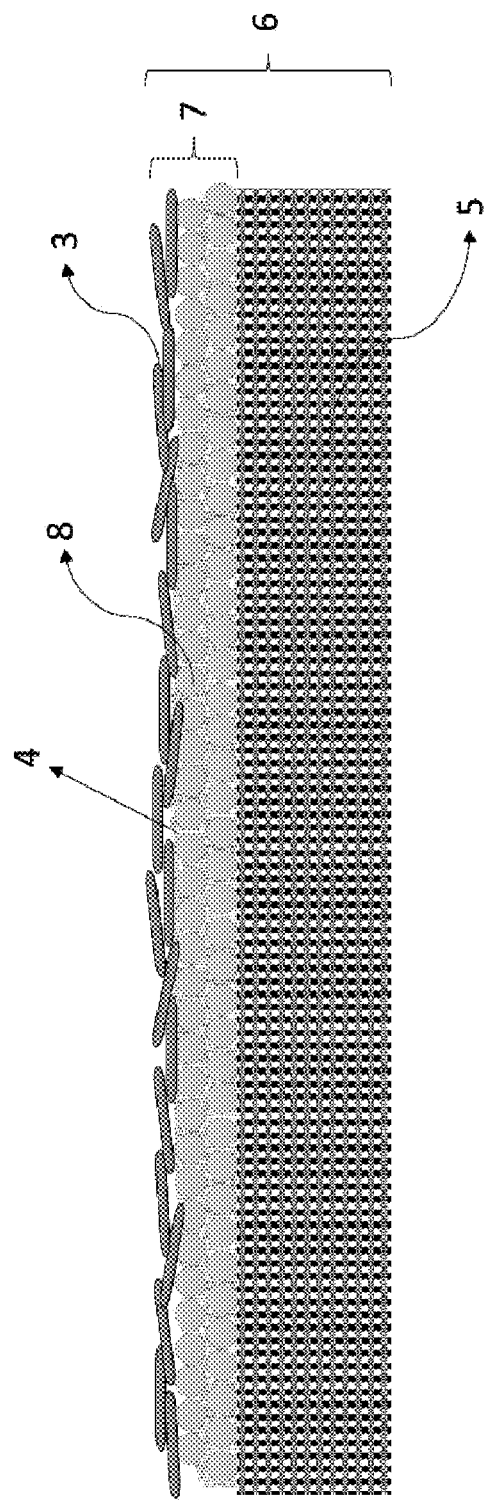
FIG. 2 depicts a schematic structure of a separator of Example 2.

FIG. 2 shows a schematic structure of a separator (6) of Example 2, in which a protective porous layer (7) having a two-layered structure comprising a whisker-type material (3), a particular-type material (8), and an organic binder (4) is formed on a porous base material (5).

The particulate-type material serves not only to control the pore size and porosity of the separator but also maintains the physical shape of the protective porous layer. The whisker-type material can significantly increase the mechanical strength of the protective porous layer, thereby improving the tensile strength and impact resistance of the separator. It is because a network structure is obtained by random orientation and distribution of the whisker-type material in the protective porous layer. Hence, the use of the whisker-type material enables reinforcement of the mechanical strength of the separator.

The protective porous layer of the present invention has uniform pore structure allowing lithium ions to move smoothly therethrough.

In addition, since pores present in the particulate-type material of the present invention have such a size that lithium ions solvated with electrolyte solvent molecules can sufficiently pass therethrough, they can serve as an additional pathway for lithium ions. Therefore, lithium ion conductivity in a battery is improved.

Moreover, the inorganic filler disclosed herein has high dielectric constant, which can contribute to increase the dissociation degree of an electrolyte salt in a liquid electrolyte, such as a lithium salt, thereby ensuring sufficient ionic conductivity.

There is no particular limitation in thickness of the protective porous layer of the present invention. In some embodiments, the protective porous layer has a thickness from about 1 µm to about 100 µm, from about 1 µm to about 50 µm, from about 2 µm to about 30 µm, from about 2 µm to about 25 µm, from about 4 µm to about 20 µm, from about 4 µm to about 15 µm, from about 5 µm to about 25 µm, from about 5 µm to about 20 µm, from about 5 µm to about 15 µm, or from about 5 µm to about 10 µm.

The coating solution for a separator comprising an inorganic filler, organic binder, and solvent with desired ratio is coated onto at least one surface of a porous base material. The thickness of the protective porous layer coated onto the porous base material will depend upon the particular composition of the coating solution and the final thickness desired in the separator.

In some embodiments, the average thickness ratio of the second layer of the protective porous layer to the first layer of the protective porous layer is from about 1:3 to about 3:1.

In certain embodiments, the average thickness ratio of the second layer of the protective porous layer to the first layer of the protective porous layer is about 1:3, about 1:2.5, about 1:2, about 1:1.5, about 1:1.3, about 1:1, about 1.3:1, about 1.5:1, about 2:1, about 2.5:1, or about 3:1.

Another advantage of the separator disclosed herein is that it has outstanding safety and exhibits no or very slight contraction at high temperature. It is because the inorganic filler which adheres to the porous base material has a melting point which is well above the safety-relevant temperature range for electrochemical cells and hence suppresses thermal contraction of the separator. In particular, a network structure is obtained by random orientation and distribution of the whisker-type material in the protective porous layer, which contributes to a superior resistance to thermal shrinkage.

In some embodiments, the protective porous layer of the present invention contains an inorganic filler and an organic binder. The inorganic filler could be joined to the nonwoven or to each other by the organic binder. In certain embodiments, the organic binder is an organic polymer. The use of the organic polymer makes it possible to produce a separator with adequate mechanical flexibility.

Some non-limiting examples of the organic binder include polyester, polyamide, polyether, polycarboxylates, polycarboxylic acid, polyvinyl compound, polyolefin, rubber, polyvinyl pyrrolidone, polyacrylic acid, polyacrylate, polymethacrylic acid, polymethacrylate, polystyrene, polyvinyl alcohol, polyvinyl acetate, polyacrylamide, cellulose, cellulose acetate, cellulose acetate butyrate, cellulose acetate propionate, carboxymethyl cellulose, cyanoethylcellulose, cyanoethylsucrose, polyurethane, nitrile butadiene rubber (NBR), styrene butadiene rubber (SBR), latex, acrylonitrile-styrene-butadiene copolymer, halogenated polymer, fluorinated polymer, chlorinated polymer, unsaturated polymer, conjugated diene polymer, and combinations thereof.

Some non-limiting examples of the polyvinyl compound include those that consist of N-vinylamide monomers such as N-vinyl formamide and N-vinyl acetamide or that contain these monomers. The poly-N-vinyl compound is characterized by good wettability. Homopolymers, copolymers, and block copolymers can also be used herein. In some embodiments, the polyvinyl compound is a random, block or alternating interpolymer. In further embodiments, the polyvinyl compound is a di-block, tri-block or other multi-block interpolymer.

Some non-limiting examples of the rubber include natural rubber, isoprene rubber, butadiene rubber, chloroprene rubber, styrene butadiene rubber, and nitrile butadiene rubber. These rubbers contain unsaturated double bonds. In some embodiments, the rubber is a random, block or alternating interpolymer. In further embodiments, the rubber is a di-block, tri-block or other multi-block interpolymer. Unsaturated polymers are generally characterized by good adhesive properties.

In some embodiments, the organic binder is a water-soluble polymer. In certain embodiments, the water-soluble polymer is a monomer containing a carboxylic acid group, a sulfonic acid group, or a combination thereof.

Some non-limiting examples of the monomer having a carboxylic acid group include monocarboxylic acid, dicarboxylic acid, anhydride of dicarboxylic acid, and derivatives thereof. Some non-limiting examples of the monocarboxylic acid include acrylic acid, methacrylic acid, crotonic acid, 2-ethylacrylic acid, and isocrotonic acid. Some non-limiting examples of the dicarboxylic acid include maleic acid, fumaric acid, itaconic acid, and methyl maleic acid. Some non-limiting examples of the anhydride of dicarboxylic acid include maleic anhydride, acrylic anhydride, methyl maleic anhydride, and dimethyl maleic anhydride.

Some non-limiting examples of the monomer having a sulfonic acid group include vinylsulfonic acid, methyl vinylsulfonic acid, (meth)allylsulfonic acid, styrenesulfonic acid, (meth)acrylic acid-2-ethyl sulfonate, 2-acrylamide-2-methylpropanesulfonic acid, 3-allyloxy-2-hydroxypropanesulfonic acid, and 2-(N-acryloyl)amino-2-methyl-1,3-propane-disulfonic acid.

By varying the concentration of the organic binder and inorganic filler in the slurry, control over the homogeneity of the organic binder can be obtained. In certain embodiments, the amount of the organic binder is distributed homogeneously throughout the protective porous layer.

In some embodiments, the protective porous layer is a single-layered structure and has a first side adjacent to the porous base material and a second side adjacent to an anode or a cathode, wherein an amount of the organic binder at the first side is greater than an amount of the organic binder at the second side.

In certain embodiments, the protective porous layer is a two-layered structure comprising a first layer and a second layer, wherein the first layer has a first side adjacent to the porous base material and the second layer has a second side adjacent to an anode or a cathode, wherein an amount of the organic binder at the first side is greater than an amount of the organic binder at the second side.

FIG. 1 shows the region where more of the organic binder (4) is included in the protective porous layer (2) is shaded darker, while the region where less of the organic binder is included in the protective porous layer (2) is shaded lighter. More of the organic binder is included at the first side of the protective porous layer than at the second side of the protective porous layer. When more of the organic binder is included at the first side than at the second side, the separator may be better adhered to the porous base material (5). Hence, the separator disclosed herein has good peeling resistance.

There is no particular limitation in mixing ratio of an inorganic filler to an organic binder in the protective porous layer of the present invention. The mixing ratio of the inorganic filler to the organic binder can be controlled according to the thickness and structure of the protective porous layer to be formed.

In some embodiments, a weight ratio of the inorganic filler to the organic binder in the protective porous layer formed on the porous base material according to the present invention is from about 1:1 to about 99:1, from about 70:30 to about 95:5, from about 95:5 to about 35:65, from about 65:35 to about 45:55, from about 20:80 to about 99:1, from about 10:90 to about 99:1, from about 5:95 to about 99:1, from about 3:97 to about 99:1, from about 1:99 to about 99:1, or from about 1:99 to about 1:1.

If the weight ratio of the inorganic filler to the organic binder is less than 1:99, the content of binder is so great that pore size and porosity of the protective porous layer may be decreased. When the content of the inorganic filler is greater than 99 wt. %, the polymer content is too low to provide sufficient adhesion among the inorganic filler, resulting in degradation in mechanical properties and impaired peeling resistance of a finally formed protective porous layer.

In a separator having a protective porous layer on a porous base material, ions are conducted mainly through pores in the separator. Therefore, when there are variations in the thickness of the protective porous layer, variations occur in the path length of ion-conducting pores, and uniform ion permeability over the entire separator cannot be maintained. Generally, the region with high ion permeability is prone to degradation. As a result, the cycle characteristics of the entire battery may be adversely affected.

Variations in the areal weight of the protective porous layer are one of the factors that determine the level of ion permeability. Variations in the areal weight ($g/m^2$) of the protective porous layer are determined by the ratio of the standard deviation of the areal weight of the protective porous layer to the mean of the areal weight of the protective porous layer (i.e., standard deviation of areal weight/mean of areal weight).

In some embodiments, the ratio represented by "(standard deviation of areal weight of the protective porous layer)/(mean of areal weight of the protective porous layer)" is 0.3 or less, 0.2 or less, 0.1 or less, or 0.05 or less.

Because only a very small variation in the areal weight of the protective porous layer is observed in the present invention. The separator disclosed herein can effectively prevent short circuits and is particularly suitable for electrochemical cells having a high capacity and high energy density.

In some embodiments, the protective porous layer disclosed herein may comprise at least one additive other than the inorganic filler and organic binder for the purposes of improving and/or controlling the processibility, physical, chemical, and/or mechanical properties of the separator. Some non-limiting examples of the additive include a viscosity modifier, a surfactant, a defoaming agent, or a combination thereof. The additive is generally less than 2% by weight, or from about 0.1% to about 1% by weight, based on the total weight of the inorganic filler and organic binder.

A coating slurry added with the viscosity modifier can have high stability and low tendency to cause sedimentation or aggregation of solid content.

Some non-limiting examples of the viscosity modifier include cellulose derivatives such as carboxymethyl cellulose (CMC); poly(meth)acrylic acid salts such as sodium poly(meth)acrylate; polyvinyl alcohol, modified polyvinyl alcohol, and polyethylene oxide; polyvinylpyrrolidone, polycarboxylic acid, oxidized starch, starch phosphate, casein, modified starches, and chitin and chitosan derivatives.

Some non-limiting examples of the cellulose derivatives include carboxymethyl cellulose, carboxymethylethyl cellulose, methyl cellulose, ethyl cellulose, ethylhydroxyethyl cellulose, hydroxyethyl cellulose, hydroxypropyl cellulose, and ammonium salts and alkali metal salts thereof.

A surfactant can be used to improve the homogeneity and stability of the coating slurry and thus coating of the separator. This leads to the improved mechanical properties of the separator.

In some embodiments, the surfactant is a non-ionic surfactant. Some non-limiting examples of suitable non-ionic surfactant include alkoxylated alcohol, carboxylic ester, polyethylene glycol ester, and combinations thereof. Some non-limiting examples of suitable alkoxylated alcohol include ethoxylated and propoxylated alcohols. Some non-limiting examples of suitable ethoxylated alcohols include octylphenol ethoxylates and nonylphenol ethoxylates.

The separator of the present invention exhibits a high tensile strength in both the TD and MD directions and hence a high tearing resistance. Because of its high mechanical strength in the TD and MD directions, the separator can be prevented from being damaged at the step of winding the separator, making it possible to reduce percent defective attributed to the separator for battery.

When the separator has a significant difference between tensile strength along the TD and MD directions, mechanical strength of the separator can be reduced, thereby deteriorating puncture strength of the separator.

The separator disclosed herein exhibits similar tensile strength in both the MD direction and TD direction. In some embodiments, a difference in tensile strength of separator along the TD direction and MD direction is about 30% or less, about 25% or less, about 20% or less, about 18% or less, about 15% or less, about 13% or less, about 10% or less, about 8% or less, or about 5% or less. A separator having this difference in tensile strength along the TD direction and MD direction can prevent the separator from being damaged during assembly into battery.

The separator disclosed herein exhibits a high porosity. The pore size and porosity of the separator are mainly dependent on the size and shape of the inorganic filler. In some embodiments, the separator of the present invention has a porosity from about 30% to about 99%, from about 40% to about 95%, from about 50% to about 95%, from about 50% to about 90%, from about 60% to about 90%, from about 70% to about 90%, from about 40% to about 75%, from about 20% to about 60%, from about 35% to about 60%, from about 45% to about 55%, or from about 30% to about 50%.

In some embodiments, the separator of the present invention has a porosity of more than 40%, more than 50%, more than 55%, more than 60%, more than 65%, more than 70%, more than 75%, more than 80%, more than 85%, more than 90%, or more than 95%. A separator having this porosity can yield a battery with a good ion permeability.

The large porosity of the substrate means a higher porosity for the separator of the present invention, which is why a higher uptake of electrolytes is obtainable with the separator of the present invention.

In some embodiments, the separator of the present invention has an average pore size from about 1 nm to about 350 nm, from about 1 nm to about 100 nm, from about 20 nm to about 100 nm, from about 40 nm to about 350 nm, from about 40 nm to about 80 nm, from about 50 nm to about 80 nm, from about 0.1 μm to about 70 μm, from about 1 μm to about 60 μm, from about 1 μm to about 50 μm, from about 1 μm to about 40 μm, from about 1 μm to about 30 μm, from about 1 μm to about 20 μm, from about 1 μm to about 10 μm, from about 1 μm to about 5 μm, or from about 1 μm to about 3 μm.

Separator of the present invention prevents short circuits due to metal dendrite growth. No dendrite penetration can form from one side to the other side of the separator. Contrary to cylindrical pores of a separator, it is conceivable that the pores might form a labyrinthine structure in which no dendrite penetration can form from one side to the other side of the separator. Therefore, there is no need to increase the thickness of the separator for preventing dendrite penetration. A separator that is too thick can compromise battery capacity.

In some embodiments, the separator has a thickness from about 10 μm to about 200 μm, from about 30 μm to about 100 μm, from about 10 μm to about 75 μm, from about 10 μm to about 50 μm, from about 10 μm to about 20 μm, from about 15 μm to about 40 μm, from about 15 μm to about 35 μm, from about 20 μm to about 40 μm, from about 20 μm to about 35 μm, from about 20 μm to about 30 μm, from about 30 μm to about 60 μm, from about 30 μm to about 50 μm, or from about 30 μm to about 40 μm.

In some embodiments, the separator of the present invention has a thickness of less than 40 μm, less than 35 μm, less than 30 μm, less than 25 μm, or less than 20 μm. A separator having this thickness can yield a battery with a high power density.

In another aspect, provided herein is a method for producing a battery, comprising, inserting the separator disclosed herein into the battery.

Also provided herein is a lithium battery comprising the separator disclosed herein.

The separators according to the present invention are highly suitable for use in fast charging batteries. A battery equipped with this separator is heat-resistant, and is therefore able to tolerate the temperature increase due to the rapid charging without adverse changes to the separator and/or damages to the battery. These batteries consequently can have a very rapid charging rate.

This is a distinct advantage when batteries equipped with the separator disclosed herein are used in electric vehicles or hybrid vehicles, since fast charging is feasible in the course of an hour or less.

The nail penetration test is an important method to access the safety of Li-ion cells presumably to simulate internal shorts, which is widely used across the battery industry and battery-user community. It involves driving a metallic nail through a charged Li-ion cell at a prescribed speed. The cell is deemed to have passed if there is no smoke or flame following the puncturing, by visually confirmation.

In the nail penetration test, a nail was used to puncture a battery. A short circuit current flows through the nail and causes a thermal runaway with a sharp temperature rise. The separator disclosed herein does not exhibit a large degree of shrinkage. Even though the polymer is at or above its melting point or partially dissolved, the structure of the protective porous layer does not collapse. Only the polymeric porous base material would slightly melt at the site of puncture and contract but not the inorganic filler. Therefore, the short circuit location does not further expand. The separator disclosed herein has a high stability. In this manner, the organic separator plays a role of keeping safety of the lithium ion secondary battery and this safety feature is particularly important for automotive use.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The tensile strengths of the separators (Examples 1-7) below were measured by a universal testing machine UTM (obtained from MTS Systems Corporation, US; model no. MTS 895). Each of the separators was cut into a rectangular shape having a size of 10 mm×50 mm (length (MD)×width (TD)) at 10 different regions to obtain 10 specimens. Then, each of the specimens was placed in the machine between the grips and gripped to have a length of 20 mm, followed by measurement of average tensile strength in the machine direction (MD) and the transverse direction (TD) while applying pulling force to the specimen at room temperature. The stress at break was taken as tensile strength.

The thickness of each separator was measured using a contact thickness meter (obtained from Sony Manufacturing Systems Corporation, JP; model no. digital micrometer M-30).

Variations in the areal weight ($g/m^2$) of the protective porous layer are determined by the ratio of the standard deviation of the areal weight of the protective porous layer to the mean of the areal weight of the protective porous layer (i.e. standard deviation of areal weight/mean of areal weight). The areal weight of a protective porous layer is measured as follows. A separator is cut to prepare ten sample pieces having a size of 10 cm×10 cm, and the areal weight of each sample piece is measured. The protective porous layer in each sample piece is then dissolved and removed by a solvent, and the areal weight of each porous base material is measured. Subsequently, the areal weight of the porous base material is subtracted from the areal weight of the separator to determine the areal weight of the protective porous layer of each sample piece.

The porosity can be determined by the known method of mercury porosimetry in accordance with DIN 66133. Porosimetry is an analytical technique used to determine various quantifiable aspects of a material's porous nature. This technique measures the pressure required to force mercury into membrane pores through the use of a porosimeter.

The nail penetration test was conducted by passing a stainless steel nail with 3 mm diameter and 80° taper angle through the test cell in a state of charge of 95% with a speed of 1 cm/second.

The chemicals were purchased and used as received.

Example 1

Preparation of a Separator Coated with a Whisker-Type Material

An aqueous binder solution was prepared by dissolving 50 g of carboxymethyl cellulose (CMC) (obtained from DAICEL Corporation, Japan; product no. CMC1390) in 6.55 L de-ionized water. To the aqueous binder solution were added 120 g of $K_2TiO_3$ whiskers (obtained from Shanghai Dian Yang Industry Co. LTD, China) and 7.5 g of styrene butadiene rubber (SBR) (obtained from NIPPON A&L INC., Japan; product no. AL-2001). The whiskers had an average diameter of 0.8 μm and an average length of 10 μm. After the addition, the suspension was stirred for 30 minutes at room temperature at a stirring speed of 50 rpm (revolution per minute) to form a slurry.

A 30 cm wide nonwoven PET fabric (obtained from MITSUBISHI PAPER MILLS LTD, Japan) having a thickness of about 20 μm and a weight per unit area of about 10 g/m² was then coated with the above slurry by a continuous roll coater having a doctor blade (obtained from Shenzhen KEJINGSTAR Technology Ltd., China; model no. AFA-EI300-UL). The nonwoven subsequently passed through an oven integrated in the roll coater and dried at a temperature of 100° C. in a hot air stream. The coating speed was in the range of 1.2-1.7 meter/minute. A coating thickness was controlled by an adjustable gap width between a coating blade and coating surface. A ratio of the standard deviation of the areal weight of the protective porous layer to the mean of the areal weight of the protective porous layer was 0.15. A coated separator having a total thickness of about 30 μm and a porosity of about 62% was obtained.

Example 2

Preparation of a Separator Coated with Whisker-Type and Particular-Type Materials A first aqueous binder solution was prepared by dissolving 22 g of CMC in 3.2 L de-ionized water. To the first aqueous binder solution were added 60 g of $Al_2O_3$ particles (obtained from Taimei Chemicals Co. Ltd., Japan; product no. TM-100) and 4 g of SBR. The particles had an average diameter of 8 μm. After the addition, the suspension was stirred for 30 minutes at room temperature at a stirring speed of 50 rpm to form a first slurry.

A second aqueous binder solution was prepared by dissolving 20 g of CMC in 3.35 L de-ionized water. To the second aqueous binder solution were added 50 g of $K_2TiO_3$ whiskers and 3 g of SBR. The whiskers had an average diameter of 0.5 μm and an average length of 4 μm. After the addition, the suspension was stirred for 30 minutes at room temperature at a stirring speed of 50 rpm to form a second slurry.

A 30 cm wide nonwoven PET fabric (obtained from MITSUBISHI PAPER MILLS LTD, Japan) having a thickness of about 20 μm and a weight per unit area of about 10 g/m² was then coated with the first slurry by a continuous roll coater having a doctor blade. The nonwoven subsequently passed through an oven and dried at a temperature of 90° C. in a hot air stream. The coating speed was in the range of 1.0-1.4 meter/minute. A coating thickness was controlled by an adjustable gap width between a coating blade and coating surface, and a coated separator having a first layer of a protective porous layer with a thickness of about 8 μm was obtained. The coated separator obtained was further coated with the second slurry by a continuous roll coater having a doctor blade to form a second layer of a protective porous layer. The nonwoven subsequently passed through an oven and dried at a temperature of 100° C. in a hot air stream. The coating speed was in the range of 1.0-1.4 meter/minute. A coating thickness was controlled by an adjustable gap width between a coating blade and coating surface. A ratio of the standard deviation of the areal weight of the protective porous layer to the mean of the areal weight of the protective porous layer was 0.18. A coated separator comprising the first and second layers of the protective porous layer having a final total thickness of about 32 μm and a porosity of about 55% was obtained.

Example 3

Preparation of a Separator Coated with a Particular-Type Material

An aqueous binder solution was prepared by dissolving 50 g of CMC in 6.55 L de-ionized water. To the aqueous binder solution were added 100 g of $Al_2O_3$ particles (obtained from Taimei Chemicals Co. Ltd., Japan; product no. TM-100) and 7.5 g of SBR. The particles had an average diameter of 2 μm. After the addition, the suspension was stirred for 30 minutes at room temperature at a stirring speed of 50 rpm to form a slurry.

A 30 cm wide nonwoven PET fabric (obtained from MITSUBISHI PAPER MILLS LTD, Japan) having a thickness of about 20 μm and a weight per unit area of about 10 g/m² was then coated with the above slurry by a continuous roll coater having a doctor blade. The nonwoven subsequently passed through an oven and dried at a temperature of 100° C. in a hot air stream. The coating speed was in the range of 1.5-1.7 meter/minute. A coating thickness was controlled by an adjustable gap width between a coating blade and coating surface. A ratio of the standard deviation of the areal weight of the protective porous layer to the mean of the areal weight of the protective porous layer was 0.1. A coated separator having a total thickness of about 31 μm and a porosity of about 61% was obtained.

Example 4

Preparation of a Separator Coated with a Particular-Type Material

An aqueous binder solution was prepared by dissolving 50 g of CMC in 6.55 L de-ionized water. To the aqueous binder solution were added 115 g of $ZrO_2$ particles (obtained from Shanghai Dian Yang Industry Co. LTD, China; product no. ZR-25(M)) and 7.5 g of SBR. The particles had an average diameter of 800 nm. After the addition, the suspension was stirred for 30 minutes at room temperature at a stirring speed of 50 rpm to form a slurry.

A 30 cm wide nonwoven PET fabric (obtained from MITSUBISHI PAPER MILLS LTD, Japan) having a thickness of about 20 μm and a weight per unit area of about 10 g/m² was then coated with the above slurry by a continuous roll coater having a doctor blade. The nonwoven subsequently passed through an oven and dried at a temperature of 100° C. in a hot air stream. The coating speed was in the range of 1.5-1.7 meter/minute. A coating thickness was controlled by an adjustable gap width between a coating blade and coating surface. A ratio of the standard deviation of the areal weight of the protective porous layer to the mean of the areal weight of the protective porous layer was 0.15. A coated separator having a total thickness of about 31 μm and a porosity of about 63% was obtained.

Example 5

Preparation of a Separator Coated with a Mixture of Whisker-Type and Particular-Type Materials An aqueous binder solution was prepared by dissolving 55 g of CMC in 6.55 L de-ionized water. To the aqueous binder solution were added 40 g of SiO$_2$ particles (obtained from Sigma-Aldrich, US; product no. S5631), 75 g of K$_2$Ti$_6$O$_{13}$ whiskers (obtained from Shanghai Dian Yang Industry Co. LTD, China), and 8.0 g of styrene butadiene rubber (SBR) (obtained from NIPPON A&L INC., Japan; product no. AL-2001). The particles had an average diameter of 1.5 µm. The whiskers had an average diameter of 2 µm and an average length of 20 µm. After the addition, the suspension was stirred for 50 minutes at room temperature at a stirring speed of 50 rpm to form a slurry.

A 30 cm wide nonwoven PET fabric (obtained from MITSUBISHI PAPER MILLS LTD, Japan) having a thickness of about 20 µm and a weight per unit area of about 10 g/m$^2$ was then coated with the above slurry by a continuous roll coater having a doctor blade. The nonwoven subsequently passed through an oven and dried at a temperature of 100° C. in a hot air stream. The coating speed was in the range of 1.2-1.5 meter/minute. A coating thickness was controlled by an adjustable gap width between a coating blade and coating surface. A ratio of the standard deviation of the areal weight of the protective porous layer to the mean of the areal weight of the protective porous layer was 0.14. A coated separator having a total thickness of about 30 µm and a porosity of about 55% was obtained.

Example 6

Preparation of a Separator Coated with Whisker-Type and Particular-Type Materials A first aqueous binder solution was prepared by dissolving 30 g of CMC in 3.2 L de-ionized water. To the first aqueous binder solution were added 60 g of ZrO$_2$ particles (obtained from Shanghai Dian Yang Industry Co. LTD, China; product no. ZR-25(M)) and 4 g of SBR. The particles had an average diameter of 10 µm. After the addition, the suspension was stirred for 30 minutes at room temperature at a stirring speed of 50 rpm to form a first slurry.

A second aqueous binder solution was prepared by dissolving 12 g of CMC in 3.35 L de-ionized water. To the second aqueous binder solution were added 50 g of Na$_2$Ti$_6$O$_{13}$ whiskers (obtained from Shanghai Whisker Composite Manufacturing Co. Ltd.; China) and 3 g of SBR. The whiskers had an average diameter of 0.8 µm and an average length of 4.5 µm. After the addition, the suspension was stirred for 30 minutes at room temperature at a stirring speed of 50 rpm to form a second slurry.

A 30 cm wide nonwoven PET fabric (obtained from MITSUBISHI PAPER MILLS LTD, Japan) having a thickness of about 20 µm and a weight per unit area of about 10 g/m$^2$ was then coated with the first slurry by a continuous roll coater having a doctor blade. The nonwoven subsequently passed through an oven and dried at a temperature of 90° C. in a hot air stream. The coating speed was in the range of 1.0-1.4 meter/minute. A coating thickness was controlled by an adjustable gap width between a coating blade and coating surface, and a coated separator having a first layer of a protective porous layer with a thickness of about 11 µm was obtained. The coated separator obtained was further coated with the second slurry by a continuous roll coater having a doctor blade to form a second layer of a protective porous layer. The nonwoven subsequently passed through an oven and dried at a temperature of 100° C. in a hot air stream. The coating speed was in the range of 1.0-1.4 meter/minute. A coating thickness was controlled by an adjustable gap width between a coating blade and coating surface. A ratio of the standard deviation of the areal weight of the protective porous layer to the mean of the areal weight of the protective porous layer was 0.22. A coated separator comprising the first and second layers of the protective porous layer having a final total thickness of about 35.5 µm and a porosity of about 54% was obtained.

Example 7

Preparation of a Separator Coated with Whisker-Type and Particular-Type Materials A first aqueous binder solution was prepared by dissolving 30 g of CMC in 3.2 L de-ionized water. To the first aqueous binder solution were added 60 g of TiO$_2$ particles (obtained from Shanghai Dian Yang Industry Co. LTD, China) and 4 g of SBR. The particles had an average diameter of 1 µm. After the addition, the suspension was stirred for 30 minutes at room temperature at a stirring speed of 50 rpm to form a first slurry.

A second aqueous binder solution was prepared by dissolving 20 g of CMC in 3.35 L de-ionized water. To the second aqueous binder solution were added 50 g of K$_2$Ti$_6$O$_{13}$ whiskers (obtained from Shanghai Whisker Composite Manufacturing Co. Ltd., China) and 3 g of SBR. The whiskers had an average diameter of 0.5 µm and an average length of 5 µm. After the addition, the suspension was stirred for 30 minutes at room temperature at a stirring speed of 50 rpm to form a second slurry.

A 30 cm wide nonwoven PET fabric (obtained from MITSUBISHI PAPER MILLS LTD, Japan) having a thickness of about 20 µm and a weight per unit area of about 10 g/m$^2$ was then coated with the first slurry by a continuous roll coater having a doctor blade. The nonwoven subsequently passed through an oven and dried at a temperature of 90° C. in a hot air stream. The coating speed was in the range of 1.0-1.4 meter/minute. A coating thickness was controlled by an adjustable gap width between a coating blade and coating surface, and a coated separator having a first layer of a protective porous layer with a thickness of about 12 µm was obtained. The coated separator obtained was further coated with the second slurry by a continuous roll coater having a doctor blade to form a second layer of a protective porous layer. The nonwoven subsequently passed through an oven and dried at a temperature of 100° C. in a hot air stream. The coating speed was in the range of 1.0-1.4 meter/minute. A coating thickness was controlled by an adjustable gap width between a coating blade and coating surface. A ratio of the standard deviation of the areal weight of the protective porous layer to the mean of the areal weight of the protective porous layer was 0.18. A coated separator comprising the first and second layers of the protective porous layer having a final total thickness of about 37 µm and a porosity of about 51% was obtained.

The tensile strength of separators of Examples 1-7 were measured. Table 1 shows the tensile strength test results of separators of Examples 1-7 respectively.

TABLE 1

| Property | Test direction | Example 1 | Example 2 | Example 3 | Example 4 | Example 5 | Example 6 | Example 7 |
|---|---|---|---|---|---|---|---|---|
| Tensile strength (MPa) | MD | 21.30 | 23.52 | 17.64 | 17.45 | 18.77 | 22.84 | 22.47 |
|  | TD | 19.05 | 21.75 | 15.35 | 15.28 | 17.09 | 20.13 | 20.3 |
| Tensile strength ratio | MD/TD | 1.12 | 1.08 | 1.11 | 1.14 | 1.10 | 1.13 | 1.11 |

Based on the MD and TD data in Table 1 above, the MD and TD values of Example 1 are higher than those of Examples 3-4. Therefore, there is a noticeable improvement in mechanical strength of separators coated with a whisker-type material over a particular-type material.

Based on the tensile strength ratio (i.e. difference in tensile strength along the TD direction and MD direction) in Table 1 above, the tensile strength ratios of Examples 1-7 are less than 15%.

Example 8

Assembling of Pouch-Type Full Lithium-Ion Batteries

Preparation of Positive Electrodes

The positive electrode slurry was prepared by mixing 94 wt. % cathode material (LNMC TLM 310, obtained from Xinxiang Tianli Energy Co. Ltd., China), 3 wt. % carbon black (SuperP; obtained from Timcal Ltd, Bodio, Switzerland) as a conductive agent, and 3 wt. % polyvinylidene fluoride (PVDF; Solef® 5130, obtained from Solvay S. A., Belgium) as a binder and dispersed in N-methyl-2-pyrrolidone (NMP; purity of >99%, obtained from Sigma-Aldrich, USA) to form a slurry with a solid content of 50 wt. %. The slurry was then uniformly spread onto aluminum foil as a current collector using a doctor blade coater (obtained from Shenzhen KejingStar Technology Ltd., China; model no. MSK-AFA-III) and dried at 50° C. for 12 hours to obtain a cathode aluminum film.

Preparation of Negative Electrodes

The negative electrode slurry was prepared by mixing 90 wt. % of hard carbon (HC; purity of 99.5%, obtained from Ruifute Technology Ltd., Shenzhen, Guangdong, China) with 5 wt. % polyvinylidene fluoride (PVDF) as a binder and 5 wt. % carbon black as a conductive agent and dispersed in N-methyl-2-pyrrolidone to form another slurry with a solid content of 50 wt. %. The slurry was then uniformly spread onto copper foil as a current collector using a doctor blade coater and dried at 50° C. for 12 hours to obtain an anode copper film.

Assembling of Pouch-Type Batteries

After drying, the resulting cathode film and anode film were used to prepare the cathode sheet and anode sheet respectively by cutting into pieces of square shape in the size of 6 cm×8 cm. Two pouch-type batteries were prepared by stacking the cathode and anode sheets in an alternating manner and separated by the separator prepared in Examples 1 and 2 respectively. The electrolyte was a solution of LiPF$_6$ (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content <1 ppm. After electrolyte filling, the pouch cells using different separators were vacuum sealed and then mechanically pressed using a punch tooling with standard shape.

Electrochemical Measurements

Nominal Capacity

The cells were tested galvanostatically at a current density of C/2 at 25° C. on a multi-channel battery tester between 2.9 V and 4.2 V. The nominal capacity for cell made with separator of Example 1 was about 1.5 Ah, and for cell made with separator of Example 2 was about 1.7 Ah.

Cyclability Performance of Battery with Separator of Example 1

Figure 3:
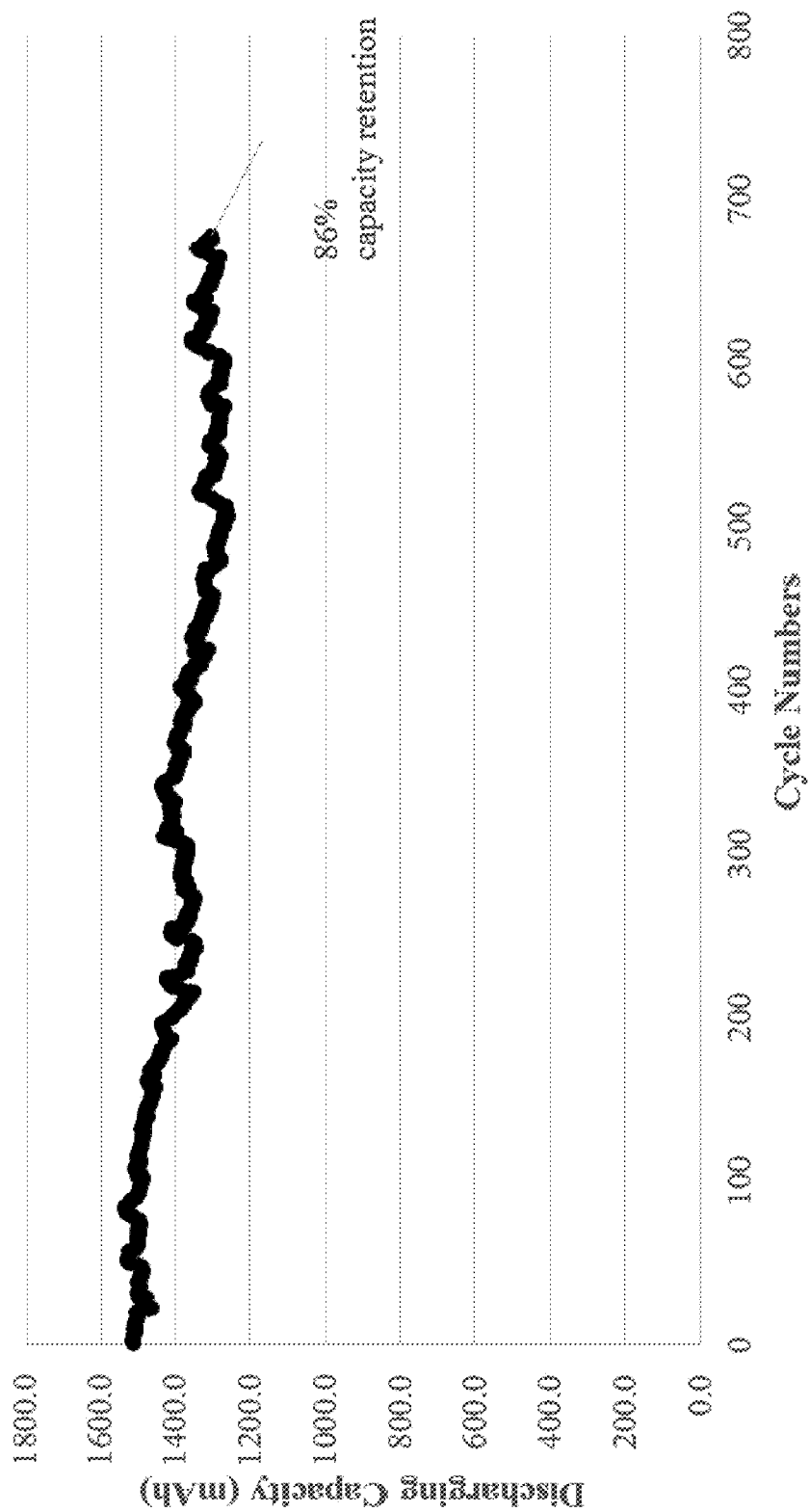
FIG. 3 depicts the cycling performance of a full lithium-ion battery cell having a separator of Example 1.

The cyclability performance of the pouch cell made with the separator of Example 1 was tested by charging and discharging at a constant current rate of 1 C between 3.0 V and 4.2 V. Test result of cyclability performance is shown in FIG. 3. The capacity retention after 678 cycles was about 86% of the initial value.

The battery using the separator of Example 1 shows good cyclability due to uniformity of coating and high ion permeability of the separator. In addition, good performance of the separator of Example 1 also proves that the separator disclosed herein has high quality after high-speed assembly in the manufacture of battery.

Cyclability Performance of Battery with Separator of Example 2

Figure 4:
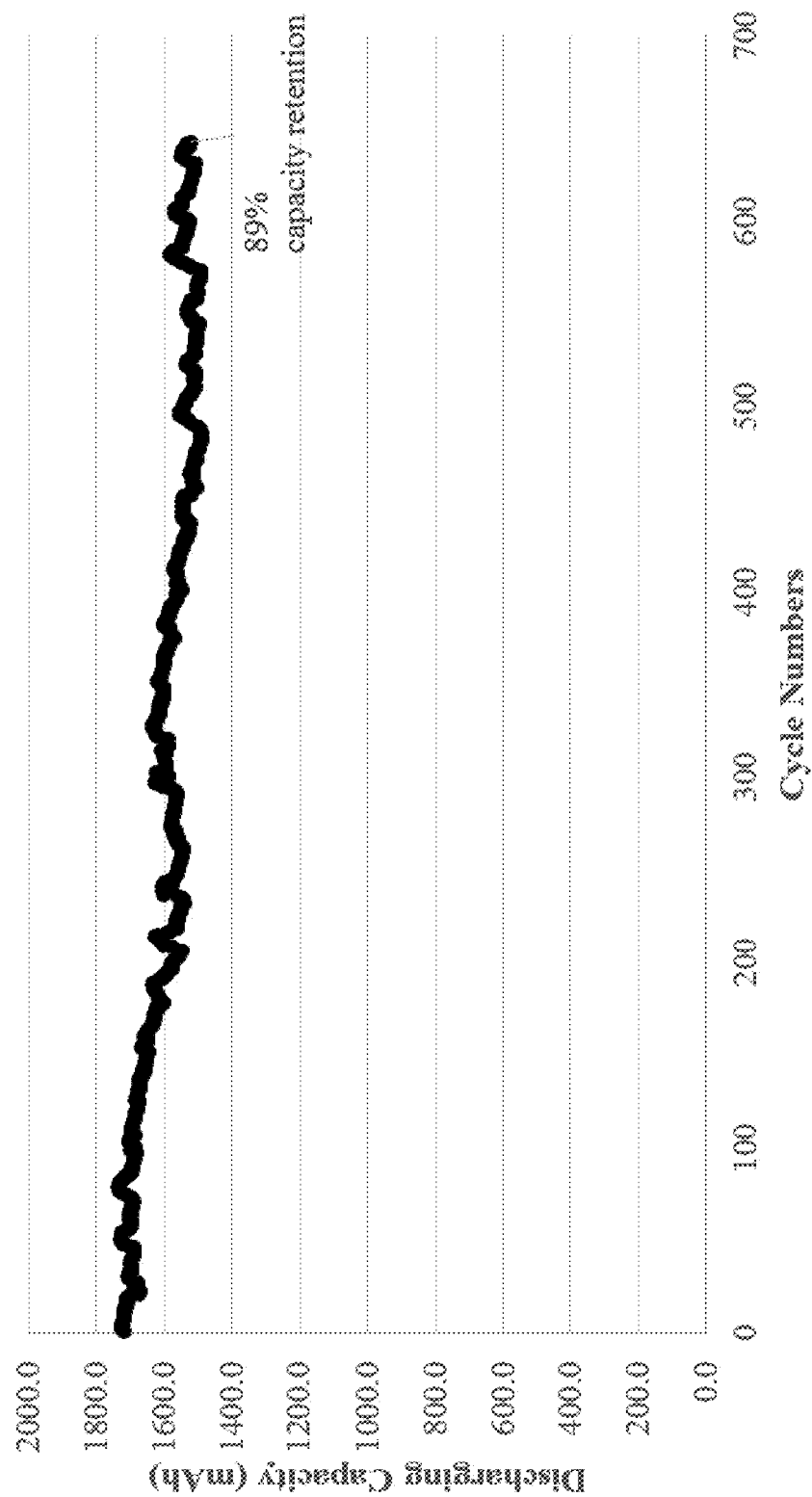
FIG. 4 depicts the cycling performance of a full lithium-ion battery cell having a separator of Example 2.

The cyclability performance of the pouch cell made with the separator of Example 2 was tested by charging and discharging at a constant current rate of 1 C between 3.0 V and 4.2 V. Test result of cyclability performance is shown in FIG. 4. The capacity retention after 643 cycles was about 89% of the initial value.

The battery using the separator of Example 2 shows good cyclability due to uniformity of coating and high ion permeability of the separator. In addition, good performance of the separator of Example 2 also proves that the separator disclosed herein has high quality after high-speed assembly in the manufacture of battery.

Nail Penetration Test

Safety tests were conducted on pouch cells made of the separators of Examples 1 and 2 respectively, and a commercial battery cell (obtained from Shandong Hengyu New Energy Co., Ltd., China) made of a multi-transition metal (Ni, Mn, Co) oxide cathode material. They had the same capacity of 10 Ah and the size of 160 mm (L)×120 mm (W)×10 mm (T) and were in a state of charge above 95%. The nail penetration test for the pouch cell made of the separators of Examples 1 and 2 showed no generation of smoke or ignition, whereas the commercial battery cell suffered ignition immediately after penetration of nail. Therefore, a high level of safety with no smoke or ignition was achieved in the nail penetration test of the cell made of the separators of the present invention.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist.

The appended claims intend to cover all those modifications and variations as falling within the scope of the invention.

What is claimed is:

1. A secondary-battery separator comprising, a porous base material, and a protective porous layer coated on one or both surfaces of the porous base material, wherein the protective porous layer comprises an organic binder and an inorganic filler, wherein the protective porous layer has a first side adjacent to the porous base material and a second side adjacent to an anode or a cathode, wherein an amount of the organic binder at the first side is greater than an amount of the organic binder at the second side, and wherein a difference in tensile strength of the separator along the TD direction and MD direction is about 15% or less.

2. The secondary-battery separator of claim 1, wherein the inorganic filler is a whisker material selected from the group consisting of $Al_2O_3$, $SiO_2$, $TiO_2$, $ZrO_2$, $BaO_x$, ZnO, $CaCO_3$, TiN, AlN, $MTiO_3$, $K_2O \cdot nTiO_2$, $Na_2O \cdot mTiO_2$, and combinations thereof, wherein x is 1 or 2; M is Ba, Sr or Ca; n is 1, 2, 4, 6 or 8; and m is 3 or 6.

3. The secondary-battery separator of claim 2, wherein the whisker material has an average diameter from about 0.05 µm to about 3 µm and a ratio of length to diameter from about 5 to about 300.

4. The secondary-battery separator of claim 1, wherein the inorganic filler is a particulate material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2.

5. The secondary-battery separator of claim 2, wherein the inorganic filler further comprises a particulate material selected from the group consisting of $Al_2O_3$, $SiO_2$, $TiO_2$, $ZrO_2$, $BaO_x$, ZnO, $CaCO_3$, TiN, AlN, and combinations thereof, wherein x is 1 or 2.

6. The secondary-battery separator of claim 5, wherein the protective porous layer is a single-layered structure, and wherein the particulate material and the whisker material are randomly distributed throughout the protective porous layer.

7. The secondary-battery separator of claim 5, wherein the protective porous layer is a two-layered structure comprising a first layer and a second layer, wherein the first layer is adjacent to the porous base material and the second layer is on and in contact with the first layer, and wherein the particulate material resides in the first layer and the whisker material resides in the second layer.

8. The secondary-battery separator of claim 5, wherein the protective porous layer is a two-layered structure comprising a first layer and a second layer, wherein the first layer is adjacent to the porous base material and the second layer is on and in contact with the first layer, and wherein greater than 50% of the particulate material resides in the first layer and greater than 50% of the whisker material resides in the second layer, based on the total volume or weight of the inorganic filler.

9. The secondary-battery separator of claim 8, wherein the average thickness ratio of the second layer to the first layer is from about 1:3 to about 3:1.

10. The secondary-battery separator of claim 8, wherein the first layer has a first side adjacent to the porous base material and the second layer has a second side adjacent to an anode or a cathode, and wherein an amount of the organic binder at the first side is greater than an amount of the organic binder at the second side.

11. The secondary-battery separator of claim 1, wherein the porous base material is a non-woven fabric consisting of natural or polymeric fibers, and wherein the polymeric fibers has a melting point of 200° C. or higher.

12. The secondary-battery separator of claim 11, wherein the polymeric fibers of the porous base material are selected from the group consisting of polyester, polyacetal, polyamide, polycarbonate, polyimide, polyetherether ketone, polyether sulfone, polyphenylene oxide, polyphenylene sulfide, polyethylene naphthalate, and combinations thereof.

13. The secondary-battery separator of claim 12, wherein the polyester is polyethylene terephthalate, polybutylene terephthalate, or a combination thereof.

14. The secondary-battery separator of claim 1, wherein the organic binder is selected from the group consisting of a polyester, polyamide, polyether, polyimide, polycarboxylate, polycarboxylic acid, polyvinyl compound, polyolefin, rubber, polyvinyl pyrrolidone, polyacrylic acid, polyacrylate, polymethacrylic acid, polymethacrylate, polystyrene, polyvinyl alcohol, polyvinyl acetate, polyacrylamide, cellulose, cellulose acetate, cellulose acetate butyrate, cellulose acetate propionate, carboxymethyl cellulose, cyanoethylcellulose, cyanoethylsucrose, polyurethane, nitrile butadiene rubber (NBR), styrene butadiene rubber (SBR), latex, acrylonitrile-styrene-butadiene copolymer, fluorinated polymer, chlorinated polymer, and combinations thereof.

15. The secondary-battery separator of claim 1, wherein the weight ratio of the inorganic filler to the organic binder is from about 99:1 to about 1:1.

16. The secondary-battery separator of claim 1, wherein the separator has a thickness from about 1 µm to about 80 µm.

17. The secondary-battery separator of claim 1, wherein the separator has a porosity from about 40% to about 97%.

18. A lithium battery comprising the separator as claimed in claim 1.

* * * * *